United States Patent Office 3,026,213
Patented Mar. 20, 1962

3,026,213
PREPARATION AND USE OF UNSATURATED ORGANOSILANES
Alfred Lester Oppegard, New Castle, and Halsey Bidwell Stevenson, Wilmington, Del., assignors to E. I. du Pont de Nemours and Company, Wilmington, Del., a corporation of Delaware
No Drawing. Filed Sept. 23, 1959, Ser. No. 841,693
25 Claims. (Cl. 106—285)

This invention is directed to a new process for preparing organo-silicon compounds and, more particularly, to a method of preparing organosilanes having carbon-to-carbon double bonds. The invention is also concerned with a new class of ethylenically unsaturated organosilanes and with coating compositions containing them.

Organosilanes have been prepared in the past by various methods such as the reaction of a Grignard reagent on tetrahalosilanes or by the reaction of an unsaturated hydrocarbon with a silane in the presence of a peroxy catalyst. The Grignard reagent is a relatively expensive reactant to use and processes which employ the reagent frequently give a mixture of products. Processes which employ peroxy catalysts with readily polymerizable unsaturated compounds generally yield undesirable mixtures of polymeric products. The development of economical processes for the preparation of organosilanes, particularly silanes in which the organic substituent contains a carbon-to-carbon double bond, is a desirable goal.

In the process of the present invention, organosilanes having bonded to the silicon at least one organic group bearing carbon-to-carbon double bonds are obtained by reacting in the presence of an alkali metal catalyst a silane having as its only substituents at most two aliphatically saturated hydrocarbyl groups with an ethylenically unsaturated hydrocarbon in which the ethylenically bonded carbons form with other doubly bonded carbons a conjugated 1,3-dienyl group. In the silane reactant, as defined, hydrogen bonded to silicon is not considered to be a substituent and the silane can, therefore, bear 2 to 4 hydrogens on the silicon.

The process of the present invention can be regarded as the reaction of three components each of which is essential for operability. The essential reactants are defined as follows:

(1) An alkali metal, i.e., an element of group I–A of the periodic table with an atomic number of at least 3, which functions as a catalyst, (2) A hydrocarbon having at least two carbon-to-carbon double bonds which form with each other a conjugated system, i.e., the structure

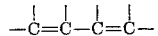

and in which at least one pair of doubly bonded carbons is part of an acyclic or alicyclic group, i.e., a non-benzenoid group, and (3) A silane in which the silicon is bonded to at least two hydrogens, any remaining valences on the silicon being satisfied by aliphatically saturated hydrocarbyl groups.

The alkali metals which are employed as catalysts are members of group I–A of the periodic table. The most readily available alkali metals are lithium, sodium, potassium and cesium. The alkali metals which are preferred for use in the process, principally because of availability, are lithium, sodium and potassium. Lithium and sodium are especially preferred.

The alkali metals can be used as pure materials, as alloys or as mixtures with inert materials. The catalyst can be employed in any convenient physical form, e.g., lumps, shavings, wire, pellets, and the like. A suspension of the alkali metal in an inert medium is an especially useful form in which to supply the catalyst and this form is preferred. Suspensions of alkali metals in inert solvents are available commercially or they are readily prepared in the laboratory.

The unsaturated hydrocarbons which are operable in the process have as an essential characteristic a chain of carbon atoms which has the structure

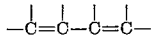

in which at least one pair of the doubly bonded carbons is ethylenically bonded, i.e., the pair of carbons are not members of an aromatic ring. The characterizing group of four carbon atoms is frequently referred to as a 1,3-conjugated diene structure. Hydrocarbons which are operable in the process can be open chain or closed chain or combinations of open and closed chains. The open chain compounds can have either a straight or branched chain structure. Examples of operable compounds are 1,3-pentadiene, 1,3,5-hexatriene, 1,3-hexadiene, 5-methyl-1,3-hexadine, 1,3-octadiene, 1,3-dodecadiene 1,3-octadecadiene, 1-vinylcyclohexene, divinylbenzene, cyclopentadiene, and vinylnaphthalene. The number of carbon atoms in the hydrocarbon is not critical but, for reasons of availability and facility of handling in the process, hydrocarbons of at most 18 carbons are preferred. Hydrocarbons of up to 12 carbons which have a terminal ethylenic bond, particularly a vinyl group (—CH=CH$_2$), which is part of a 1,3-dienyl structure form an especially preferred group of hydrocarbon reactants. Open chain hydrocarbons of the formula R'—CH=CH—CH=CH$_2$, where R' is hydrogen or a hydrocarbyl group of up to 4 carbons, provide good yields of silanes which are especially valuable for use in coating compositions.

The silanes which are employed as reactants in the process are characterized by the formula $R_{4-n}SiH_n$, where R is a hydrocarbon group and $n$ is a whole number of 2–4, inclusive, i.e., $n$ is 2, 3, or 4. The group R is preferably a saturated hydrocarbon group of up to 8 carbons. Examples of operable silanes are unsubstituted silane ($SiH_4$), monoethylsilane, dimethylsilane, diethylsilane, dipropylsilane, monobutylsilane, monooctylsilane, and cyclohexylsilane. Silanes bearing at most one substituent which substituent is a saturated hydrocarbon having up to 6 carbons, form an especially preferred group of reactants. The unsubstituted silane, also called monosilane or, simply silane, is a particularly preferred reactant which provides good yields of desirable silanes bearing unsaturated hydrocarbon groups.

Silane and hydrocarbon substituted silanes are compounds which are well known and which can be prepared by methods described in the literature. See, for example, Post, "Silicones and Other Organic Silicon Compounds," Reinhold Publishing Corp. (1949), and Rochow, "Chemistry of the Silicones," 2nd ed., Wiley (1951).

In the operation of the process of the invention the reactants are maintained in contact with each other under substantially anhydrous conditions until an appreciable amount of the desired silane is obtained. The process may be conducted by a continuous or batch method. The latter method is frequently employed solely as a matter of convenience and for simplicity of operation.

A reaction vessel is employed which is preferably corrosion-resistant and which is capable of withstanding pressure. Corrosion-resistant materials which can be used are platinum, silver, alloys of iron, nickel and molybdenum and the like. The reaction vessel is generally flushed with an inert gas, e.g., nitrogen, argon or helium, to remove air, and traces of moisture. The vessel may be cooled to a low temperature with, for example, solid carbon dioxide or liquid nitrogen, and it is evacuated to a pressure of 50 mm. or less to complete removal of traces of moisture and air. The steps of cooling and evacuating the reaction vessel are not essential for operability and they are taken primarily to facilitate charging the reactants into the vessel.

The order in which the reactants are charged into the vessel is not critical. Generally reactants of low volatility are added first and the most volatile reactant is added last.

The relative proportions in which the reactants are used are not critical. They are important only to the extent that it is desirable to utilize as much as possible of the silane, and for this reason it is preferred to use the unsaturated hydrocarbon in excess. The molar ratio of the hydrocarbon to the silane reactant can be as high as 10:1 or higher and can be as low as 1:10 or lower. The preferred molar ratio (moles hydrocarbon/moles silane) will generally lie between 5:1 and 1:5. The molar ratio of alkali metal catalyst to silane will generally be at least 1:40 and may go as high as 10:1 or higher. Sufficient alkali metal is employed in the process to assure its presence as a catalyst. The preferred molar ratio (alkali metal/silane) will lie between 1:20 and 1:2.

The reaction generally proceeds rapidly even at low temperatures, e.g., —40° C. or lower. It is customary to heat the reactants after mixing to assure maximum yield of products but high temperatures are not essential, particularly when monosilane ($SiH_4$) is employed as the silicon-bearing reagent. The final temperatures employed are, of course, dependent to some extent on the reactivity of the unsaturated hydrocarbon and on the silane. In general, the temperature of reaction does not exceed 200° C. and, preferably, is no higher than about 100° C.

The pressure at which the reaction is conducted and the length of time the reactants are maintained in contact with each other are not critical features of the invention. Reaction frequently begins when the components are mixed and the pressure is autogenous. The pressure may, therefore, be atmospheric, below atmospheric or above atmospheric pressure. In a batch process wherein the reactants are heated in a confined space, the pressure will normally be superatmospheric but in a continuous flow process where the reaction products are continuously removed, the pressure can be atmospheric or subatmospheric. The time of reaction may be as low as 0.1 second or even lower in a continuous flow process or it may be as much as 25 hours or more in a batch process.

The reactants are preferably mixed during the operation to assure maximum contact and thereby to obtain maximum yields of the desired products in the shortest time. The reaction vessel may be shaken mechanically or it may be equipped with a mechanically driven agitator.

A solvent may be employed, if desired, as an aid in maintaining close contact between the reactants. Any solvent employed must obviously be unreactive with the components of the reaction. Saturated hydrocarbons (e.g., cyclohexane, octane) or saturated ethers (e.g., dibutyl ether, dicyclohexyl ether) are examples of suitable solvents. It is not essential, however, for operability that a solvent be employed.

The operation of the process is illustrated more fully in the following examples in which quantities of reactants are expressed as parts by weight unless stated otherwise.

*Example I*

A pressure vessel (capacity, 100 parts of water), lined with a corrosion-resistant steel, is charged with 0.4 part of lump sodium and 7 parts of diethyl ether. Two steel balls (¼" diameter) are added to the vessel and it is then capped and cooled to about —75 to —80° C. with solid carbon dioxide. The cooled reaction vessel is evacuated to a low pressure, e.g., 20 mm. or less, and it is then charged with 11 parts of butadiene and 7 parts of silane ($SiH_4$). The vessel and contents are heated with mechanical agitation at 40° C. for 10 hours. Pressure in the vessel rises to about 400 lb./sq. in. but gradually decreases to 200 lb./sq. in. as the reaction proceeds. The vessel is cooled and 3 parts of unreacted gases are removed by venting into a cooled trap. The residue consisting of 17 parts of liquid and solid is filtered and the colorless filtrate is distilled through an efficient fractionating column and there is obtained 1 part of monobutenylsilane, boiling at 56–57° C., and 1.73 parts of dibutenylsilane, boiling at 89° C./82 mm. Identity of the compounds is confirmed by the infrared spectrum and elemental analysis.

*Analysis.*—Calc'd for $C_4H_7SiH_3$: Si, 32.55; active H, 3.49. Found: Si, 31.16; active H, 3.31.

Calc'd for $(C_4H_7)_2SiH_2$: Si, 20.00; active H, 1.43. Found: Si, 19.65; active H, 1.49.

*Example II*

Using the procedure described in Example I, a reaction vessel is charged with 0.5 part of lump sodium, 20 parts of styrene, and 7 parts of diethyl ether. It is cooled, evacuated and 3 parts of silane are added. The reaction mixture is heated at 40° C. for 10 hours at a pressure which initially is 210 lb./sq. in. and which decreases to 50 lb./sq. in. There is obtained 28 parts of a mixture of liquid and solids which is centrifuged to separate the liquid portion. Fractional distillation of this portion yields 2.8 parts of di-α-phenylethylsilane, boiling at 130–133° C./0.2 mm., which has the following structure:

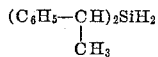

The identity of the compound is confirmed by the infrared spectrum and by elemental analysis.

*Analysis.*—Calc'd for $C_{16}H_{18}SiH_2$: Si, 11.67; active H, 0.83. Found: Si, 12.17; active H, 0.88.

Examples I and II illustrate the process of the invention in which the alkali metal is introduced in the reaction chamber in an aggregate or non-dispersed form. The presence of steel balls assists in mixing the catalyst with the other reactants. In this mode of operation, the principal reaction products are mono- or disubstituted silanes.

*Example III*

A pressure vessel (capacity, 400 parts of water) lined with a corrosion-resistant steel, is charged as described in Example I with 5 parts of a 50% suspension of sodium in xylene, 12 parts of diethyl ether, 123 parts of butadiene and 25 parts of silane. The mixture reacts vigorously at —10° C. and, after the vigor of the reaction has subsided, the mixture is heated to 40–50° C. for 11 hours under autogenous pressure. The reaction mixture is filtered and the filtrate is distilled through an efficient fractionating column to yield 110 parts of tributenylsilane, boiling at 144–151° C./77 mm., $n_D^{25}$, 1.4807.

*Example IV*

A reaction vessel of the type described in Example I is charged with 3 parts of a 30% suspension of lithium in liquid petrolatum, 7 parts of diethyl ether, 27 parts of butadiene and 8 parts of silane. The mixture is heated under autogenous pressure for 2 hours at 40° C., 2 hours at 75° C. and 7 hours at 100° C. The reaction mixture is filtered and the filtrate is fractionally distilled to give 16 parts of dibutenylsilane, boiling at 80–86° C./71 mm., $n_D^{25}$, 1.4603, and 10 parts of tributenylsilane, boiling at 70–73° C./1.4 mm., $n_D^{25}$, 1.4800.

Examples III and IV illustrate the process of the invention employing a finely divided suspension of the alkali metal. In this mode of operation, the principal product is a trisubstituted silane.

Example V

A reaction vessel of the type described in Example III is charged with 5 parts of a 50% suspension of sodium in xylene, 12 parts of diethyl ether, 132 parts of isoprene and 32 parts of silane. The reaction mixture is heated 2 hours at 39–40° C., 2 hours at 61–65° C. and 7 hours at 75–76° C. The mixture is filtered and the filtrate is distilled through an efficient fractionating column to obtain 4 parts of mono(methylbutenyl)silane boiling at 82.5–83.5° C.; $n_D^{25}$, 1.4303. The product is shown by infrared analysis to be a mixture of 2-methyl-2-butenylsilane and 3-methyl-2-butenylsilane.

*Analysis.*—Calc'd for $C_4H_{12}Si$: C, 59.90; H, 12.07; Si, 28.02. Found: C, 60.65; H, 12.70; Si, 27.71.

There is also obtained 2.5 parts of a mixture of di-(methylbutenyl)silanes, boiling at 82–104° C./25 mm.; $n_D^{25}$, 1.4839. The mixture is shown by infrared analysis to consist of silanes bearing methyl-3-butenyl and methyl-2-butenyl groups.

Example V illustrates the process of the invention employing a branched chain diene as the reactant.

Example VI

A pressure vessel of the type described in Example III is charged with 4 parts of a 25% dispersion of sodium lithium alloy (95–5) in mineral oil (i.e., 1 part of alloy to 3 parts of mineral oil), 75 parts of butadiene and 17 parts of silane. The reaction mixture is heated under autogenous pressure and with mechanical agitation at 40° C. for 17 hours. The mixture is filtered and the filtrate is fractionally distilled to yield 4 parts of dibutenylsilane, boiling at 86–88° C./75 mm.; $n_D^{25}$, 1.4613, and 56 parts of tributenylsilane, boiling at 144–149° C./74 mm., $n_D^{25}$, 1.4814.

*Analysis.*—Calc'd for $C_{12}H_{22}Si$: C, 74.14; H, 11.41; Si, 14.45. Found: C, 74.20; H, 11.87; Si, 14.46.

Example VI illustrates the use of an alloy of alkali metals in the absence of a solvent. The example also illustrates the mode of operation employing the catalyst in a finely divided suspension to obtain principally the trisubstituted silane.

Example VII

A pressure vessel of the type described in Example III is charged as described in previous examples with 23 parts of n-propylsilane, 1 part of a 50% suspension of sodium in xylene and 21 parts of diethyl ether. To this mixture there is then added 67 parts of butadiene. The reaction mixture is heated with agitation for 14 hours at 50° C. The reaction products are carefully distilled through an efficient fractionating column to obtain n-propyl-3-butenylsilane, a compound whose structure is $C_3H_7SiH_2(CH_2CH_2CH=CH_2)$. The identity of the compound is confirmed by the infrared spectrum.

Example VII illustrates the process of the invention employing a hydrocarbon substituted silane.

Using the procedure illustrated in the above examples, butenylmethylsilane is obtained from butadiene and monomethylsilane with a lithium catalyst, (methylbutenyl)dimethylsilane is obtained from isoprene and dimethylsilane with a potassium catalyst, butenylcyclohexylsilane is obtained from butadiene and monocyclohexylsilane with a sodium catalyst, dibutylhexenylsilane is obtained from 1,3-hexadiene and dibutylsilane with a cesium catalyst, monooctenylsilane is obtained from 1,3-octadiene and silane with a sodium/lithium alloy catalyst, dipentenylsilane is obtained from 1,3-pentadiene and silane with a suspension of sodium metal catalyst, and di-2,5-dimethylhexenylsilane is obtained from 2,5-dimethyl-1,3-hexadiene and silane with a suspension of potassium metal catalyst. Mixtures of dienes can be employed with a silane or with mixtures of silanes to obtain products which have a wide range of physical properties.

As shown in the preceding examples, the principal products of the process are silanes bearing unsaturated hydrocarbon substituents which have the same number of carbon atoms as the hydrocarbon reactants employed in the process. The substituents have one less ethylenic bond than the original hydrocarbon reactant. Thus, with silane ($SiH_4$) as the reactant, there can be obtained silanes of the formula $R''SiH_3$, $R''_2SiH_2$ and $R''_3SiH$, where $R''$ is a group having the same number of carbon atoms as the unsaturated hydrocarbon component employed in the process; with methylsilane as a reactant there can be obtained silanes of the formula $CH_3(R'')SiH_2$ and $CH_3(R'')_2SiH$ and with dimethylsilane there are obtained silanes of formula $(CH_3)_2R''SiH$. Each $R''$ group has one less ethylenic bond than the unsaturated hydrocarbon reactant employed in the process.

In the process of the present invention employing an alkali metal catalyst, as described above, dienes and silanes react readily, even at low temperatures, for example, 0° C. or lower. The process of the invention, therefore, avoids side reactions which occur at the higher temperatures required by other processes employing different catalysts, e.g., peroxy catalysts. Substantially no dimerization or trimerization of the unsaturated hydrocarbon occurs in the process of the present invention. In the absence of an alkali metal catalyst, dimerization or polymerization of the conjugated diene does occur to a substantial extent, shown by the following example:

A reaction vessel of the type described in Example III is charged with 81 parts of butadiene and 16 parts of silane. The mixture is heated for 16 hours and the temperature is raised at a uniform rate from 100° C. to 300° C. There is obtained a clear, light yellow liquid which is fractionally distilled to yield 28 parts of vinyl cyclohexene (a dimer of butadiene), boiling at 128–130° C., $n_D^{25}$, 1.4614, and 3 parts of a mixture of vinyl cyclohexene and the adduct of silane and vinylcyclohexene boiling at 77–80° C./77 mm., $n_D^{25}$, 1.4734. This mixture contains 72.79% C., 11.30% H, and 16.08% Si. The structure of the adduct as cyclohexenylethylsilane is confirmed by the infrared spectrum.

The butenylsilanes obtained by the process of the invention can be reacted with alcohols to obtain alkoxy-substituted butenylsilanes. The preparation of this type of compound is illustrated in Example VIII.

Example VIII

A reaction vessel is charged with 11.5 parts of tributenylsilane, obtained as described in Example IV, and 40 parts of methanol. To this solution there is added 5 parts of methanol containing 0.2 part of dissolved sodium. The reaction mixture is heated to 65° C. and a total of 0.14 part of hydrogen is evolved in 2.5 hours. The reaction mixture is neutralized with phosphoric acid and it is fractionally distilled to yield 9.7 parts of tributenylmethoxysilane, boiling at 45–47° C./0.04 mm.; $n_D^{25}$, 1.4759. The identity of the compound is confirmed by elemental analysis.

*Analysis.*—Calc'd. for $C_{13}H_{24}OSi$: C, 69.57; H, 10.78; Si, 12.52. Found: C, 69.25; H, 10.54; Si, 12.54.

The procedure of Example VIII is applicable to the preparation of a wide range of alkoxy-substituted butenylsilanes. By using the appropriate alcohol with tributenylsilane there can be obtained tributenylethoxysilane, tributenylisopropoxysilane, tributenylbutoxysilane and the like. Dibutenylsilane can be employed to obtain dialkoxy - substituted dibutenylsilanes. Butenylsilanes bearing alkoxy-substituents derived from the lower alkyl alcohols are preferred.

In its compound aspects the invention is generic to butenylsilanes having from 1–3 butenyl groups, any remaining substituents on the silicon being lower alkoxy groups, hydrogen not being considered as a substituent. Generically, they can be represented by the following formula:

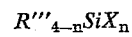

where R′′′ is a 3-butenyl group, (CH₂=CH—CH₂—CH₂—)

X is hydrogen or lower alkoxy (R′′′′O, where R′′′′ is lower alkyl) and $n$ is 1–3, inclusive.

The products obtained by the process of the invention and their alkoxy derivatives obtained by reaction with alcohols are generically useful as non-corrosive components of coating compositions which are applied to non-porous surfaces of materials such as metals to render the surfaces resistant to corrosion and marring. The products are equally useful as components of coating compositions to be applied to porous surfaces of materials such as fabrics, wood or brick to render the surfaces water-repellent.

Products which are particularly useful are obtained from the reaction of silane and butadiene as illustrated in Examples I, III, IV, and VI. These compounds are represented by the formula $R'''_{4-n}SiH_n$, where R′′′ is butenyl group and $n$ has a value of 1–3, inclusive. The butenyl groups bonded to the silicon are predominantly 3-butenyl. These silanes can be air-dried to form insoluble coatings or polymers, as shown by the following examples:

*Example A*

Approximately 0.5 parts of dibutenylsilane, prepared as described in Example VI, is placed in a closed flat glass vessel which is heated by steam at atmospheric pressure for 5 hours. A viscous oil remains spread over the bottom of the glass vessel. The cover of the vessel is removed and the open vessel is heated in air at steam temperature (2–3 hours) to obtain a clear flexible film which adheres to the glass surface.

*Example B*

Dibutenylsilane is placed in a glass vessel and oxygen is bubbled through the silane at 50° C. for 1 hour and at 80–85° C. for 7 hours. The viscous product is cooled and then heated to a maximum of 50° C. at 1 mm. pressure to remove volatile material. There remains a rubbery polymer which is partly soluble in toluene or chloroform. Clear light-colored water-repellent films can be prepared from the polymer by conventional methods.

The tributenylsilane, obtained by the process of the invention, can be air-blown to form viscous oils which, in contrast to the products obtained from dibutenylsilane in Example B, are soluble in solvents used in coating compositions. The air-blown tributenylsilane can be cured to a tough insoluble film, as shown in Example C.

*Example C*

Tributenylsilane, obtained as described in Example VI, is placed in a glass vessel and oxygen is passed through the silane at 80–100° C. for 13 hours. A thick oil forms which is soluble in aromatic hydrocarbons and which is about 100 times as viscous as the original silane. Oils having viscosities from about 1–10 poises are obtained. The viscous oil is dissolved in an equal weight of toluene to form a clear, light yellow solution of varnish-like consistency which is employed as a coating composition, as illustrated in the following paragraphs.

A clean steel panel is coated with the toluene solution and the panel is exposed to air until the toluene has evaporated. The panel is then heated at 125° C. for 1 hour. The coating on the panel is adherent, clear, hard and abrasion-resistant. It is unaffected by organic solvents such as acetone, benzene and ethanol, and it is water-repellent. The coating has a low coefficient of friction and it is resistant to deterioration by light. Exposure of the coated panel to a bright light source (i.e., the "Fade-Ometer") for 200 hours results only in a slight increase in the hardness of the coating.

A toluene solution of blown tributenylsilane, obtained as described above, is spread on a glass plate and it is then exposed to air at the prevailing temperature (about 25° C.). The coating is tack-free in 24 hours and cures to a hard abrasion-resistant film in 7 days without heating.

A toluene solution of blown tributenylsilane, obtained as described above, is applied to the surfaces of sections of white pine, red oak, mahogany, fir plywood and pressed wood fibers. The sections are heated one hour at 125° C. and a second application of the toluene solution is made in the same manner as the first application. The sections are again heated one hour at 125° C. The coatings on the surfaces are adherent, very smooth, clear and hard. They are mar-resistant and unaffected by organic solvents.

To obtain a faster rate of cure a small quantity of a metal drier, e.g., 0.1–1.0% of cobalt octanoate, is added to the solution of blown tributenylsilane. Metal driers are not essential, as shown by the preceding examples, but their use is frequently advantageous. Examples of metal driers which may be used are cobalt naphthenate, manganese naphthenate, copper naphthenate, cobalt acetate, copper oleate, and manganese linoleate.

The di- and tributenylsilanes obtained by the process are primarily 3-butenylsilanes, i.e., compounds with the general formula $(CH_2=CH—CH_2—CH_2)_nSiH_{4-n}$, where $n$ is 2 or 3. Either of these compounds produces satisfactory coatings and they may be used separately or in admixture with each other. These compounds and coating compositions containing them form a part of this invention.

The tributenylsilane product of the invention containing principally tri(3-butenyl)silane is a preferred product. As demonstrated earlier, the tributenylsilane can be air-blown to a viscous soluble product which is a valuable component of coating compositions. Tributenylsilane, coating compositions containing it and the resultant coatings are an especially preferred group of products which are part of this invention.

The butenylsilanes, particularly the tributenylsilanes, are soluble in a wide range of solvents employed in lacquers and varnishes. The silanes are soluble in acetone, methyl ethyl ketone, diethyl ketone, ethyl acetate, butyl acetate, amyl acetate, xylene, cyclohexene and mixtures of the various solvents.

The alkoxy-substituted butenylsilanes are useful as components of coating compositions and they are applied in coatings in the same manner as that described earlier for the butenylsilanes. The alkoxy-substituted butenylsilanes can be applied, for example, to wood, brick, stone, steel, or glass surfaces and air-dried to form water-repellent, mar-resistant surfaces. The alkoxy-substituted butenylsilanes, e.g., the tributenylmethoxysilane of Example VIII, can be air-blown by the procedure described in Example C to give viscous products that are used in coating compositions.

These compositions are employed as described in Example C, including varnishes, lacquers, and the like. The lower alkoxy-substituted butenylsilanes dry rapidly and they are a preferred group of this class of butenylsilanes.

The butenylsilanes of the invention may be used alone or in admixture with other coating materials, e.g., glyptal resins, drying oils, pigments, and the like.

What is claimed is:

1. A method for preparing organo-silicon compounds having carbon-to-carbon double bonds which comprises reacting under substantially anhydrous conditions in the presence of an alkali metal catalyst a hydrocarbon having at least two carbon-to-carbon double bonds in a conjugated system in which at least one pair of doubly bonded carbons is part of a non-benzenoid group, with a silane in which the silicon is bonded to at least two hydrogens any remaining valences on the silicon being satisfied by aliphatically saturated hydrocarbyl groups.

2. The process of claim 1 wherein the hydrocarbon is an aliphatic hydrocarbon.

3. The process of claim 1 wherein the hydrocarbon reactant is butadiene.

4. The process of claim 1 wherein the hydrocarbon reactant is styrene.

5. The process of claim 1 wherein the hydrocarbon reactant is isoprene.

6. The process of claim 1 wherein the alkali metal catalyst is an alkali metal of the group consisting of sodium and lithium suspended in an inert hydrocarbon medium.

7. The process of claim 1 wherein the alkali metal catalyst is sodium.

8. The process of claim 1 wherein the alkali metal catalyst is lithium.

9. The process of claim 1 wherein the hydrocarbon is reacted with silane.

10. The process of claim 1 wherein the hydrocarbon contains up to 18 carbons.

11. The process of claim 1 wherein each aliphatically saturated hydrocarbyl group is a saturated hydrocarbyl group of up to 8 carbons.

12. The process of claim 11 wherein the hydrocarbon contains up to 12 carbons and has a terminal ethylenic bond which is part of a 1,3-dienyl structure.

13. The process of claim 12 wherein the hydrocarbon is reacted with the silane at a temperature between about −40° C. and about 200° C.

14. In a method for preparing organo-silicon compounds having carbon-to-carbon double bonds, the step of contacting under substantially anhydrous conditions at temperatures below about 200° C. in the presence of an alkali metal catalyst a hydrocarbon having at least two carbon-to-carbon double bonds in a conjugated system and further having at least one pair of doubly bonded carbons as part of a non-benzenoid group, with a silane having silicon bonded to at least two hydrogens and further having any remaining valences on the silicon satisfied by aliphatically saturated hydrocarbyl groups.

15. A process for preparing organo-silicon compounds which comprises reacting under substantially anhydrous condition at temperatures below about 200° C. a hydrocarbon of the formula R′—CH=CH—CH=CH$_2$, wherein R′ represents a member of the group consisting of hydrogen and hydrocarbyl groups of up to four carbons with a silane of the formula R$_{4-n}$SiH$_n$, wherein R is a saturated hydrocarbon group of up to eight carbons and $n$ is a whole number of from 2–4 inclusive in the presence of an alkali metal.

16. A process comprising reacting butadiene with silane in the presence of sodium under substantially anhydrous conditions at temperatures below about 200° C.

17. A process comprising reacting butadiene with silane in the presence of lithium under substantially anhydrous conditions at temperatures below about 200° C.

18. A process comprising reacting butadiene with n-propyl silane in the presence of sodium under substantially anhydrous conditions at temperatures below about 200° C.

19. A process comprising reacting butadiene with silane in the presence of a sodium lithium alloy under substantially anhydrous conditions at temperatures below about 200° C.

20. Products prepared by bubbling a gas consisting essentially of oxygen through a butenylsilane of the formula $(CH_2=CH—CH_2—CH_2—)_{4-n}SiX_n$, wherein X is selected from the group consisting of hydrogen and lower alkoxy groups, and $n$ is 1–3, inclusive.

21. A coating composition comprising a product of claim 20.

22. A coating composition comprising a product of claim 20, said product having been prepared by bubbling the gas through a butenylsilane wherein X is hydrogen.

23. A coating composition comprising a product of claim 20, said product having been prepared by passing the gas through a butenylsilane wherein X is hydrogen and $n$ is 1–2, inclusive.

24. A coating composition comprising a product of claim 20 in solution in at least one solvent selected from the group consisting of toluene, acetone, methyl ethyl ketone, diethyl ketone, ethyl acetate, butyl acetate, amyl acetate, xylene and cyclohexene.

25. The coating composition of claim 24 wherein the butenylsilane is tri(3-butenyl)silane and the solvent is toluene.

References Cited in the file of this patent

UNITED STATES PATENTS

| | | |
|---|---|---|
| 2,486,162 | Hyde | Oct. 25, 1949 |
| 2,563,288 | Steinman | Aug. 7, 1951 |
| 2,721,873 | MacKenzie et al. | Oct. 25, 1955 |
| 2,723,985 | Bailey | Nov. 15, 1955 |
| 2,843,615 | Linville | July 15, 1958 |
| 2,859,198 | Sears et al. | Nov. 4, 1958 |
| 2,967,171 | Barnes et al. | Jan. 3, 1961 |

OTHER REFERENCES

Miller et al.: "Jour. Am. Chem. Soc.," vol. 79 (1957), pp. 5604–6.

Barry et al.: Jour. Am. Chem. Soc., vol. 69, November 1957, p. 2916.

Mironov et al.: Izvestia Akad. Nauk, U.S.S.R. (1958), pp. 1080–7.